US012785094B2

(12) United States Patent
Kim et al.

(10) Patent No.: US 12,785,094 B2
(45) Date of Patent: Nov. 3, 2026

(54) POSITIVE ELECTRODE WITH INCREASED HARDNESS FOR IMPROVING THE SAFETY, PRODUCTION METHOD THEREOF, AND SECONDARY BATTERY COMPRISING THE SAME

(71) Applicant: LG Energy Solution, Ltd., Seoul (KR)

(72) Inventors: Hakyoon Kim, Seoul (KR); Gi Beom Han, Daejeon (KR); Sang Wook Lee, Daejeon (KR); Sora Baek, Daejeon (KR); Jungmin Han, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 730 days.

(21) Appl. No.: 17/606,929

(22) PCT Filed: Dec. 23, 2020

(86) PCT No.: PCT/KR2020/019018
§ 371 (c)(1),
(2) Date: Oct. 27, 2021

(87) PCT Pub. No.: WO2021/137521
PCT Pub. Date: Jul. 8, 2021

(65) Prior Publication Data

US 2022/0223861 A1 Jul. 14, 2022

(30) Foreign Application Priority Data

Jan. 3, 2020 (KR) ........................ 10-2020-0000767

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *C01G 53/504* (2025.01);
(Continued)

(58) Field of Classification Search
CPC .. H01M 4/525; H01M 4/0404; H01M 4/0435; H01M 4/364; H01M 4/505; H01M 2004/028
See application file for complete search history.

(56) References Cited

U.S. PATENT DOCUMENTS

2009/0119908 A1* 5/2009 Takeda .................. H01M 4/131 29/623.5
2010/0221613 A1 9/2010 Ueki et al.
(Continued)

FOREIGN PATENT DOCUMENTS

CN 101828286 A 9/2010
CN 106017291 A 10/2016
(Continued)

OTHER PUBLICATIONS

ScienceDirect Relative Humidity (Year: 2019).*
(Continued)

*Primary Examiner* — Matthew T Martin
*Assistant Examiner* — Bartholomew A Hornsby
(74) *Attorney, Agent, or Firm* — Lerner David LLP

(57) ABSTRACT

A positive electrode for a secondary battery in which a positive electrode mixture including a positive electrode active material is formed on at least one surface of a current collector is provided. The positive electrode includes a lithium by-product so as to satisfy the following Equation 1 based on the total weight of the positive electrode mixture.
(Continued)

$$\frac{4000}{A} - 2000 \leq B(ppm) \quad \text{[Equation 1]}$$

wherein in the Equation 1,

A is the molar content of Ni when the total mole of transition metal contained in the positive electrode active material is 1, and B is the content of lithium by-product, when A is 0.5 or less, the minimum value of B is 6000 ppm. The positive electrode also has a hardness at which cracks occur in a measuring rod of 2 pi (Ø) or more.

17 Claims, 2 Drawing Sheets

(51) Int. Cl.

| | |
|---|---|
| ***C01G 53/504*** | (2025.01) |
| ***C01G 53/506*** | (2025.01) |
| ***H01M 4/02*** | (2006.01) |
| ***H01M 4/04*** | (2006.01) |
| ***H01M 4/36*** | (2006.01) |
| ***H01M 4/505*** | (2010.01) |

(52) U.S. Cl.

CPC ........ *C01G 53/506* (2025.01); *H01M 4/0404* (2013.01); *H01M 4/0435* (2013.01); *H01M 4/364* (2013.01); *H01M 4/505* (2013.01); *H01M 2004/028* (2013.01)

(56) References Cited

U.S. PATENT DOCUMENTS

| | | | |
|---|---|---|---|
| 2012/0107689 | A1 | 5/2012 | Takahashi et al. |
| 2013/0122363 | A1 | 5/2013 | Chang et al. |
| 2016/0181611 | A1 | 6/2016 | Cho et al. |
| 2016/0276664 | A1 | 9/2016 | Gunji et al. |
| 2017/0125808 | A1 | 5/2017 | Blangero et al. |
| 2017/0207455 | A1 * | 7/2017 | Watanabe ............. H01M 4/366 |
| 2017/0222223 | A1 * | 8/2017 | Hong ...................... H01M 4/62 |
| 2017/0365849 | A1 | 12/2017 | Chang et al. |
| 2019/0165362 | A1 | 5/2019 | Baek et al. |
| 2020/0014056 | A1 | 1/2020 | Park et al. |
| 2020/0136167 | A1 | 4/2020 | Park et al. |
| 2020/0212442 | A1 | 7/2020 | Watanabe et al. |
| 2021/0005891 | A1 | 1/2021 | Blangero et al. |
| 2021/0151754 | A1 | 5/2021 | Baek et al. |
| 2022/0255075 | A1 | 8/2022 | Blangero et al. |

FOREIGN PATENT DOCUMENTS

| | | | |
|---|---|---|---|
| CN | 109071266 | A | 12/2018 |
| CN | 109643794 | A | 4/2019 |
| CN | 110366540 | A | 10/2019 |
| CN | 110431691 | A | 11/2019 |
| EP | 2209152 | A1 | 7/2010 |
| EP | 2315298 | A1 | 4/2011 |
| EP | 3486979 | A1 | 5/2019 |
| EP | 3582297 | A1 | 12/2019 |
| EP | 3712989 | A1 | 9/2020 |
| EP | 3809500 | A1 | 4/2021 |
| GB | 2329755 | A | 3/1999 |
| JP | 2005108513 | A | 4/2005 |
| JP | 2009099462 | A | 5/2009 |
| JP | 2013073670 | A | 4/2013 |
| JP | 2014049390 | A | 3/2014 |
| JP | 2018172255 | A | 11/2018 |
| JP | 2019506703 | A | 3/2019 |
| KR | 19990026737 | A | 4/1999 |
| KR | 20120002414 | A | 1/2012 |
| KR | 101240174 | B1 | 3/2013 |
| KR | 101322954 | B1 | 10/2013 |
| KR | 20160050063 | A | 5/2016 |
| KR | 20160074236 | A | 6/2016 |
| KR | 20170009557 | A | 1/2017 |
| KR | 20170090196 | A | 8/2017 |
| KR | 101772737 | B1 | 9/2017 |
| KR | 101821530 | B1 | 1/2018 |
| KR | 20180041872 | A | 4/2018 |
| KR | 101886514 | B1 | 8/2018 |
| KR | 20180121484 | A | 11/2018 |
| KR | 20190001191 | A | 1/2019 |
| KR | 20190053121 | A | 5/2019 |
| KR | 20190090350 | A | 8/2019 |
| KR | 20190091155 | A | 8/2019 |
| WO | 2019239781 | A1 | 12/2019 |

OTHER PUBLICATIONS

Extended European Search Report for Application No. 20911015.4 dated Jun. 15, 2022. 9 pgs.

Search report from International Application No. PCT/KR2020/019018, mailed Apr. 8, 2021.

Search Report dated Apr. 18, 2024 from the Office Action for Chinese Application No. 202080014884.X issued Apr. 25, 2024, pp. 1-2.

Kim, A-Young, et al., "Stabilizing Effect of a Hybrid Surface Coating on a Ni-Rich NCM Cathode Material in All-Solid-State Batteries", Chem. Mater. Nov. 2019, 31, pp. 9664-9672.

* cited by examiner

【FIG. 1】
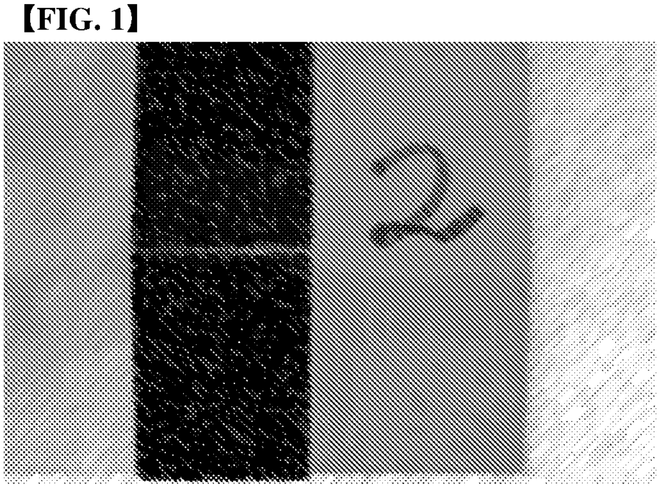
【FIG. 2】
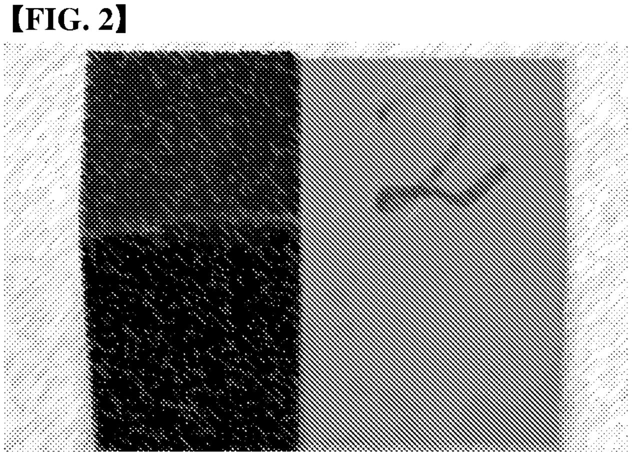

【FIG. 3】
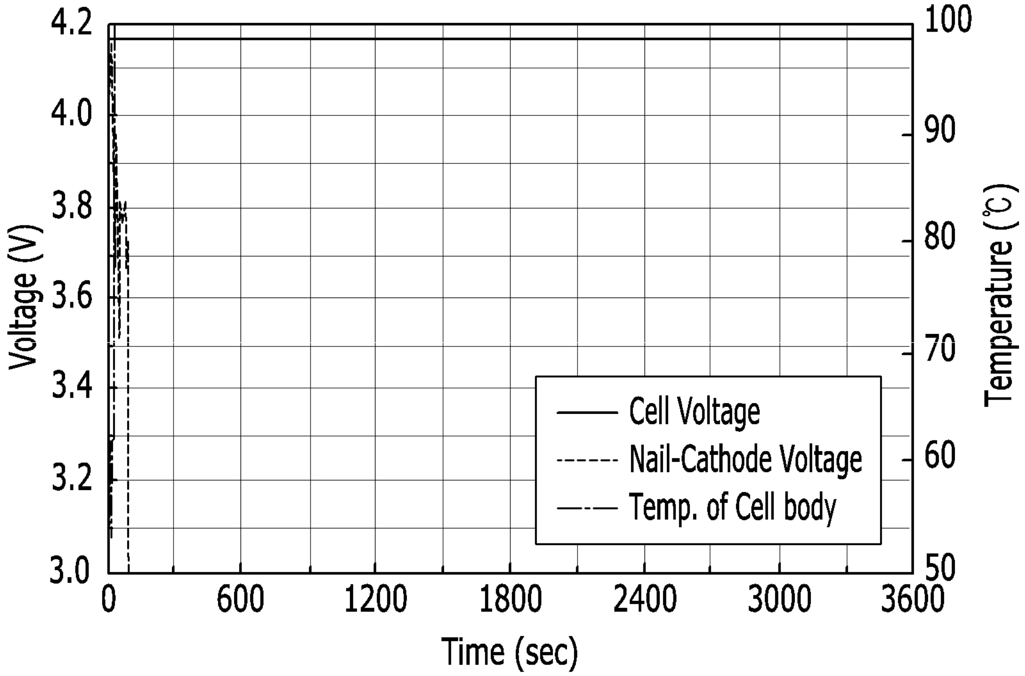
【FIG. 4】
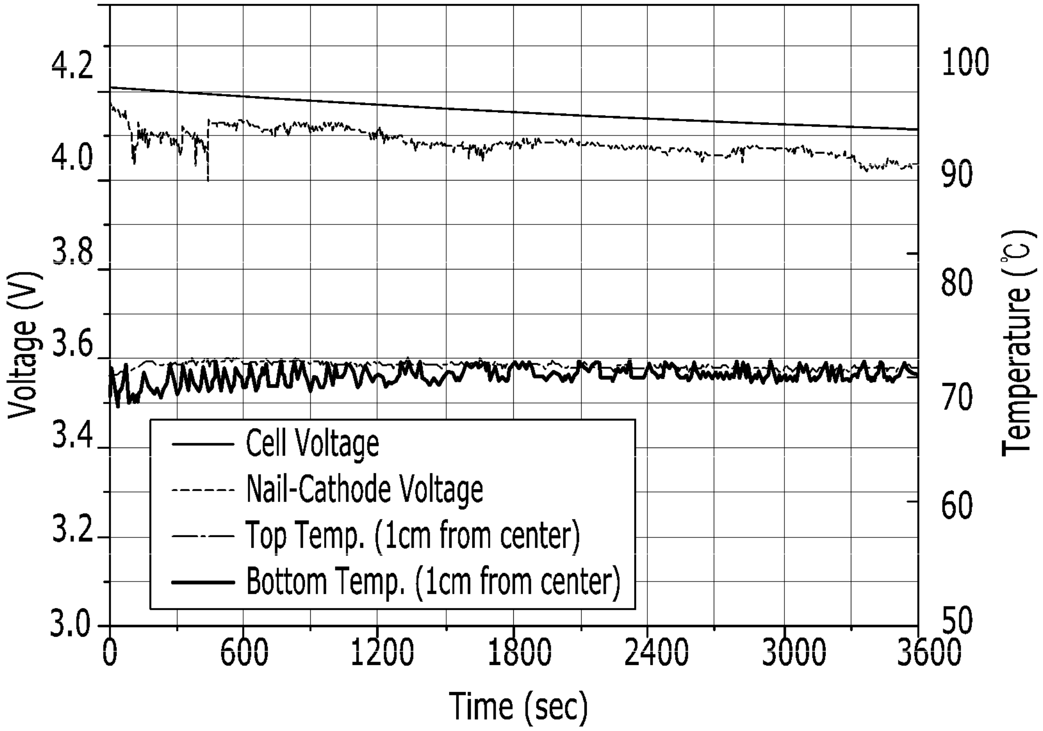

POSITIVE ELECTRODE WITH INCREASED HARDNESS FOR IMPROVING THE SAFETY, PRODUCTION METHOD THEREOF, AND SECONDARY BATTERY COMPRISING THE SAME

CROSS-REFERENCE TO RELATED APPLICATIONS

The present application is a national phase entry under 35 U.S.C. § 371 of International Application No. PCT/KR2020/019018, filed on Dec. 23, 2020, which claims the benefit of Korean Patent Application No. 10-2020-0000767 filed on Jan. 3, 2020, the disclosures of which are incorporated herein by reference in its their entirety.

TECHNICAL FIELD

Background Art

Due to the rapid increase in the use of fossil fuels, the demand for the use of alternative energy or clean energy is increasing, and as a part thereof, the fields that are being studied most actively are the fields of power generation and power storage using electrochemistry.

Currently, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high energy density and operating voltage and has long cycle life and low self-discharge rate, and has been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

In particular, as the spread of such electric vehicles increases, the technological development of secondary batteries is made in the direction of developing batteries with high capacity and high energy density. However, since high-energy density lithium secondary batteries are always at a risk of ignition or explosion, people are concerned about safety issues in the process.

Especially, when the lithium secondary battery is damaged due to an automobile accident and the like, the damage is highly likely to lead to cumulative human life damage, so the need for improving safety is also increasing.

On the other hand, in relation to safety, the nail penetration test is related to the explosion and ignition phenomenon of the secondary battery when a conductive object penetrates the secondary battery. At this time, as the area of the conductive object being in contact with the current collector of the electrodes increases, the safety decreases, and the possibility of explosion and ignition increases.

Therefore, there is an urgent need to develop a technique that can solve the above-mentioned problems and increase safety during nail penetration.

DETAILED DESCRIPTION OF THE INVENTION

Technical Problem

The present disclosure has been made to solve the above-mentioned problems, and therefore, an object of the present disclosure is to provide a positive electrode that can increase the hardness of the entire positive electrode and thus suppress thermal runaway due to a sudden increase in conductivity during nail penetration, a method for producing the same, and a secondary battery including the same.

Technical Solution

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

According to one embodiment of the present disclosure, there is provided a positive electrode for a secondary battery in which a positive electrode mixture including a positive electrode active material is formed on at least one surface of a current collector, wherein the positive electrode includes a lithium by-product so as to satisfy the following Equation 1 based on the total weight of the positive electrode mixture, and wherein the positive electrode has a hardness at which cracks occur in a measuring rod of 2 pi (Ø) or more, during a flexibility test in which the electrode is bent in half to contact the measuring rod for each pi, and then both ends of the positive electrode are lifted:

$$\frac{4000}{A} - 2000 \leq B(\text{ppm}) \quad \text{[Equation 1]}$$

in the Equation 1,

A is the molar content of Ni when the total mole of transition metal contained in the positive electrode active material is 1, and B is the content of lithium by-product, when the A is 0.5 or less, the minimum value of B is 6000 ppm.

Specifically, the content B of the lithium by-product may be 8000 ppm or less.

Here, the lithium by-product may be $Li_2CO_3$.

Moreover, a rock-salt layer may be formed on the surface of the positive electrode mixture, and the rock-salt layer may include at least one of transition metal oxides contained in the positive electrode active material, which is chemically difficult to distinguish from the positive electrode mixture layer, but whether formation is carried out or not can be confirmed through an electron scanning microscope.

As the positive electrode active material, a conventionally known positive electrode active material may be used, but specifically, it can be a lithium transition metal oxide represented by the following Chemical Formula 1.

$$Li_aNi_xCo_yM_{1-x-y}O_{2-w}A_w \quad \text{[Chemical Formula 1]}$$

wherein M is at least one selected from the group consisting of Ti, Mg, Al, Zr, Mn and $Ni_x$, A is an oxygen-substituted halogen, $1.00 \le a \le 1.05$, $0.6 \le x \le 1$, $0 \le y \le 0.4$, $0 \le 1-x-y \le 0.4$, and $0 \le w \le 0.001$.

According to another embodiment of the present disclosure, there is provided a method for producing the positive electrode, comprising the steps of:

(a) preparing a spare positive electrode active material capable of occluding and releasing lithium;

(b) exposing the spare positive electrode active material to an atmospheric moisture environment to prepare a positive electrode active material containing moisture;

(c) drying the positive electrode active material containing moisture to prepare a final positive electrode active material;

(d) mixing the final positive electrode active material, a binder, and a conductive material in a solvent to prepare an active material slurry; and (e) applying the active material slurry to at least one surface of a current collector, drying and rolling it to form an electrode.

Alternatively, according to another embodiment of the present disclosure, there is provided a method for producing the positive electrode, comprising the steps of:

(a') preparing a positive electrode active material capable of occluding and releasing lithium;

(b') mixing the positive electrode active material, a binder, and a conductive material in a solvent to prepare an active material slurry; and (c') applying the active material slurry to at least one surface of a current collector, drying, and rolling it to form a spare electrode, (d') exposing the spare electrode to an atmospheric moisture environment to prepare a spare electrode containing moisture; and (e') drying the spare electrode containing moisture to prepare a final electrode.

Here, the moisture environment may be an environment of 30% RH or more, and the exposure to the moisture environment in steps (b) and (d') may be the exposure until the content of the lithium by-product in an environment of 35% RH or more satisfies the following Equation 1:

$$\frac{4000}{A} - 2000 \le B(\text{ppm}) \quad \text{[Equation 1]}$$

in the Equation 1,

A is the molar content of Ni when the total mole of transition metal contained in the positive electrode active material is 1, and B is the content of lithium by-product, when the A is 0.5 or less, the minimum value of B is 6000 ppm.

On the other hand, according to yet another embodiment of the present disclosure, there is provided a secondary battery in which an electrode assembly is built into a battery case and is impregnated with an electrolyte solution, with the electrode assembly comprising the positive electrode, a negative electrode and a separator interposed between the positive electrode and the negative electrode.

BRIEF DESCRIPTION OF THE DRAWINGS

FIG. 1 is a photograph showing a result of a flexibility test of an electrode of Comparative Example 1 according to Experimental Example 1;

FIG. 2 is a photograph showing the result of the flexibility test of the electrode of Example 1 according to Experimental Example 1;

FIG. 3 is a graph showing the voltage and temperature of the battery after nail penetration of Comparative Example 1 according to Experimental Example 2;

FIG. 4 is a graph showing the voltage and temperature of the battery after nail penetration of Example 1 according to Experimental Example 2.

DETAILED DESCRIPTION OF THE EMBODIMENTS

Hereinafter, the present disclosure will be described in more detail.

According to one embodiment of the present disclosure, there is provided a positive electrode for a secondary battery in which a positive electrode mixture including a positive electrode active material is formed on at least one surface of a current collector, wherein the positive electrode includes a lithium by-product so as to satisfy the following Equation 1 based on the total weight of the positive electrode mixture, and wherein the positive electrode has a hardness at which cracks occur in a measuring rod of 2 pi (Ø) or more, during a flexibility test in which the electrode is bent in half to contact the measuring rod for each pi, and then both ends of the positive electrode are lifted:

$$\frac{4000}{A} - 2000 \le B(\text{ppm}) \quad \text{[Equation 1]}$$

in the Equation 1,

A is the molar content of Ni when the total mole of transition metal contained in the positive electrode active material is 1, and B is the content of lithium by-product, when the A is 0.5 or less, the minimum value of B is 6000 ppm.

Specifically, based on the fact that in the case of using a positive electrode having a hardness in which cracks occur in a measuring rod of 2 pi (Ø) or more during the flexibility test of an electrode using a measuring rod for each pi, such a positive electrode mixture interferes with the stretching of the current collector, which does not cause explosion or ignition problem during nail penetration test, the inventors of the present application have conducted intensive research to ensure that the positive electrode has such a hardness, and as a result, found that when exposing the positive electrode active material to moisture, the content of the lithium by-product increases, and such an increase in the lithium by-product also causes an increase in the hardness of the positive electrode, thereby improving safety.

That is, for the first time, the inventors of the present application have found that by exposing a certain portion of the positive electrode active material to the moisture environment, the hardness of the positive electrode may be increased, and thus, the safety of a secondary battery including the positive electrode may be improved.

Further, for the first time, the present application has confirmed that in order to produce a positive electrode having the hardness, the appropriate amount of lithium by-product in the positive electrode mixture formed by exposure to moisture is determined according to the content of Ni in the positive electrode active material, and specifically, it can be reduced as the content of Ni increases.

However, when the content of Ni is less than or equal to a specific content, the effect according to the present disclosure can be sufficiently achieved if the content of an appropriate lithium by-product is only 6000 ppm based on the total weight of the positive electrode assembly.

Meanwhile, as shown in Equation 1, as the content of the lithium by-product generated by exposure of the active material to moisture increases, the hardness of the positive electrode, which is represented by the flexibility test, also increases.

However, even when the molar content of Ni is 1, if the lithium by-product is included at a certain level or lower, this means that the active material is less exposed to the moisture environment, and in this case, the hardness of the positive electrode is not sufficiently high to the extent that cracks do not occur in the measuring rod of 2 pi (Ø) or more during the flexibility test, and thus, it should be contained at least 2000 ppm or more. On the other hand, as the molar content of Ni decreases, the content of the lithium by-product to be included at the minimum increases, but when the molar content of Ni is 0.5 or less, the effect according to the present invention may be exhibited when the content is a minimum of 6000 ppm or more.

On the other hand, when the content of the lithium by-product increases, there is a problem that the capacity of the secondary battery decreases sharply, which gives an adverse effect. Thus, specifically, the content of the lithium by-product may be a maximum of 8000 ppm or less regardless of the type of active materials.

In conclusion, in order to obtain the effect according to the present disclosure, the hardness of the positive electrode should be such that cracks occur in a measuring rod of 2 pi (Ø) or more, during a flexibility test in which the electrode is bent in half to contact the measuring rod for each pi, and then both ends of the positive electrode are lifted, and at the same time, the content of the lithium by-product should be included within the range that satisfies Equation 1.

Here, the lithium by-product is a material generated when the positive electrode active material is exposed to moisture, and may be formed by reacting Li and water present on the surface of the positive electrode active material. For example, the lithium by-product may be LiOH or $Li_2CO_3$, and specifically, LiOH also reacts with $CO_2$ in the air. As confirmed by the inventors of the present application, an increase in the hardness of the positive electrode has a correlation with an increase in the content of $Li_2CO_3$ rather than LiOH, and it may be $Li_2CO_3$.

To measure the content of the by-product, 10 g of the positive electrode active material was dispersed in 100 mL of water, and then, while titrating with 0.1 M HCl, the change in pH value was measured to obtain a pH titration curve. Using the pH titration curve, the residual amount of lithium by-products in each positive electrode active material can be calculated.

Specifically, the increase of the lithium by-product promotes the intramolecular and/or intermolecular crosslinking reaction of the binder in the positive electrode mixture, thereby increasing the alpha phase of the binder and increasing the hardness of the positive electrode.

Further, a rock-salt layer may be formed on the surface of the positive electrode mixture.

The rock-salt layer is formed by allowing the lithium by-product to change the phase of the solid content of the positive electrode mixture. Specifically, the rock-salt layer may include at least one of transition metal oxides contained in the positive electrode active material, which is chemically difficult to distinguish from the positive electrode mixture layer, but whether formation is carried out or not can be confirmed through an electron scanning microscope.

The rock-salt layer thus formed has an effect of increasing the total resistance of the positive electrode mixture, thereby lowering the conductivity during nail penetration to suppress or delay ignition, which is more preferable.

Meanwhile, the positive electrode active material contained in such a positive electrode is not limited, and example thereof may be $LiCoO_2$, $LiNiO_2$, $LiMnO_2$, $LiMn_2O_2$, $Li(Ni_aCo_bMn_c)O_2$ ($0<a<1$, $0<b<1$, $0<c<1$, $a+b+c=1$), $LiNi_{1-d}Co_dO_2$, $LiCo_{1-d}Mn_dO_2$, $LiNi_{1-d}Mn_dO_2$ ($0\le d<1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, $LiFePO_4$, or the like, and any one or a mixture of two or more thereof may be used.

However, as nickel (Ni) is contained in the active material and the content of the nickel increases, the hardness of the positive electrode increases even when exposed to a moisture environment for a short time. Thus, it may be a lithium transition metal oxide represented by the following Chemical Formula 1 where the content of nickel is excessive. In this case, the content of the lithium by-product may be in accordance with Equation 1. Moreover, when the content of Ni is small, the safety is not significantly reduced, and therefore, when the following active material containing an excessive amount of Ni is used, the effect of the present disclosure is much more largely exhibited.

$$Li_aNi_xCo_yM_{1-x-y}O_{2-w}A_w \quad \text{[Chemical Formula 1]}$$

wherein M is at least one selected from the group consisting of Ti, Mg, Al, Zr, Mn and Ni, A is an oxygen-substituted halogen, $1.00\le a\le 1.05$, $0.6\le x\le 1$, $0\le y\le 0.4$, $0\le 1-x-y\le 0.4$, and $0\le w\le 0.001$.

The positive electrode mixture may further include a conductive material and a binder in addition to the positive electrode active material, and may further include a filler if necessary.

The conductive material is used to impart conductivity to the electrode, and in the battery to be configured, the conductive material can be used without particular limitation as long as it does not cause chemical changes and has electronic conductivity. Specific examples include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative, or carbon nanotubes, and the like, and any one alone or a mixture of two or more of them may be used. In particular, it is preferable to use carbon nanotubes, which is because the material has good conductivity, so that the content of the conductive material can be minimized. The conductive material may be included in an amount of 0.5 to 10% by weight, specifically 1 to 5% by weight, based on the total weight of each positive electrode mixture.

The binder plays a role of improving adhesion between the cathode active material particles and adhesive strength between the cathode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used. The binder may be included in an amount of 0.5 to 10% by weight, specifically 1 to 5% by weight, based on the total weight of each positive electrode mixture.

When the conductive material and the binder are contained in a very large amount beyond the above range, relatively the content of the positive electrode active material is reduced, which does not meet the purpose of the invention of improving the capacity and energy density. When the conductive material and the binder are contained in a very small amount, it is difficult to exhibit conductivity and binding properties, which is not preferable.

The filler is optionally used as a component for inhibiting the expansion of positive electrode. The filler is not particularly limited so long as it is a fibrous material that does not cause chemical changes in the corresponding secondary battery. Examples of the filler include olefin-based polymers such as polyethylene and polypropylene; and fibrous materials such as glass fiber and carbon fiber. In this case, the filler may be added in an amount of 0.1 to 3% by weight based on the total weight of each positive electrode mixture.

The positive electrode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, etc. may be used. In addition, the positive electrode current collector may have a thickness of 3 μm to 500 μm, and may have fine irregularities formed on the surface of the current collector to increase the adhesion of the positive electrode active material. For example, it may be used in various forms such as films, sheets, foils, nets, porous bodies, foams, and nonwoven fabrics.

Meanwhile, according to another embodiment of the present disclosure, there is provided a method for producing the positive electrode, comprising the steps of:

(a) preparing a spare positive electrode active material capable of occluding and releasing lithium;

(b) exposing the spare positive electrode active material to an atmospheric moisture environment to prepare a positive electrode active material containing moisture;

(c) drying the positive electrode active material containing moisture to prepare a final positive electrode active material;

(d) mixing the final positive electrode active material, a binder, and a conductive material in a solvent to prepare an active material slurry; and (e) applying the active material slurry to at least one surface of a current collector, drying and rolling it to form an electrode.

Alternatively, according to another embodiment of the present disclosure, there is provided a method for producing the positive electrode, comprising the steps of:

(a') preparing a positive electrode active material capable of occluding and releasing lithium;

(b') mixing the positive electrode active material, a binder, and a conductive material in a solvent to prepare an active material slurry; and (c') applying the active material slurry to at least one surface of a current collector, drying, and rolling it to form a spare electrode, (d') exposing the spare electrode to an atmospheric moisture environment to prepare a spare electrode containing moisture; and (e') drying the spare electrode containing moisture to prepare a final electrode.

That is, the positive electrode satisfying the conditions according to the present disclosure can be produced by exposing the positive electrode active material itself to a moisture environment, or by exposing the positive electrode produced by a conventional method to a moisture environment.

When exposed to a moisture environment as described above, residual Li present on the surface of the positive electrode active material reacts with water and air to eventually produce $Li_2CO_3$, thereby increasing the hardness of the positive electrode.

Here, the moisture environment may be an environment of 30% RH or more, and the exposure to the moisture environment in the steps (b) and (d') may be the exposure until the lithium by-product content in an environment of 35% RH or more satisfies Equation 1.

As the moisture content increases, the process time is reduced, which is thus preferable, and a meaningful process time can be achieved only in an environment of at least 30% RH or higher.

Further, the moisture environment may be created at a process temperature, and may be, for example, room temperature (25° C.) to about 30° C.

First, the process of producing the spare positive electrode active material of step (a) or the positive electrode active material of step (a') may be performed by a conventionally known method of producing a positive electrode active material. This is the content known in the art, and a detailed description thereof will be omitted in the present disclosure.

Meanwhile, in a first example of the production method, the positive electrode active material itself may be exposed to a moisture environment as in step (b), and the details are as described above.

When the positive electrode active material itself is exposed to a moisture environment in this way, Li remaining on the surface of the positive electrode active material reacts with water and air to form a lithium by-product of $Li_2CO_3$. Thereafter, when the positive active material is dried as in step (c), moisture except the produced $Li_2CO_3$ evaporates, and a final positive active material may be obtained.

Even after drying, the already produced $Li_2CO_3$ remains, and therefore, when used for producing a positive electrode, the configuration of the positive electrode of the present disclosure can be obtained.

Thereafter, the process of preparing an active material slurry and forming an electrode is as conventionally known.

On the other hand, in a second example of the production method, the configuration of the present disclosure can be obtained by producing the positive electrode without performing a separate treatment of the active material, and then exposing the positive electrode to a moisture environment.

Specifically, specific preparation methods of the step (b') and the step (c') are as conventionally known.

Subsequently, the spare electrode prepared by the steps (b') and (c') may be exposed to a moisture environment.

Even in this case, the residual Li present in the positive electrode active material in the mixture reacts with water and air to form a lithium by-product of $Li_2CO_3$. Thereafter, when the spare electrode is dried as in step (e'), moisture except the produced $Li_2CO_3$ evaporates and dries, thereby producing the positive electrode according to the present disclosure.

On the other hand, according to another embodiment of the present disclosure, there is provided a secondary battery in which an electrode assembly is embedded in a battery case and impregnated with an electrolyte solution, with the electrode assembly including the positive electrode, the negative electrode, and a separator interposed between the positive electrode and the negative electrode.

Here, the secondary battery may specifically be a lithium secondary battery.

The negative electrode may also be prepared in a form in which a negative electrode material including a negative electrode active material is applied to a negative electrode current collector, and the negative electrode mixture may further include a conductive material, a binder and if necessary, a filler as described above, together with a negative electrode active material.

As the negative electrode active material, a compound capable of reversibly intercalating and deintercalating lithium may be used. Specific examples thereof may include carbonaceous materials such as artificial graphite, natural graphite, graphitized carbon fibers and amorphous carbon; metallic compounds capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ ($0<x<2$), $SnO_2$, vanadium oxide and lithium vanadium oxide; or a composite including the above metallic compound and the carbonaceous material such as a Si—C composite or a Sn—C composite, or the like, and any one or a mixture of two or more of them may be used. In addition, a metal lithium thin film may be used as the negative electrode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, meso-carbon microbeads, mesophase pitches, and high-temperature calcined carbon such as petroleum or coal tar pitch derived cokes.

The negative electrode current collector is not particularly limited as long as it has high conductivity without causing chemical changes to the battery. For example, copper, stainless steel, aluminum, nickel, titanium, calcined carbon, or a material formed by surface-treating a surface of aluminum or stainless steel with carbon, nickel, titanium, silver, or the like, aluminum-cadmium alloy, and the like may be used. In addition, the negative electrode current collector may generally have a thickness of 3 μm to 500 μm, and, like the positive electrode current collector, may have fine irregularities formed on the surface thereof to enhance the bonding strength of the negative electrode active material. For example, it may be used in various forms such as films, sheets, foils, nets, porous bodies, foams and nonwoven fabrics.

The separator separates the negative electrode and the positive electrode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof may be used. In addition, a conventional porous nonwoven fabric, for example, a nonwoven fabric made of high melting point glass fiber, polyethylene terephthalate fiber, or the like may also be used. In addition, in order to secure heat resistance or mechanical strength, a coated separator containing a ceramic component or a polymer material may be used, and optionally, a single layer or a multilayer structure may be used.

In addition, the electrolyte solution used in the present disclosure may include, but is not limited to, an organic liquid electrolyte, an inorganic liquid electrolyte, a solid polymer electrolyte, a gel polymer electrolyte, a solid inorganic electrolyte, a molten inorganic electrolyte or the like which can be used in the preparation of a lithium secondary battery.

Specifically, the electrolyte solution may include an organic solvent and a lithium salt.

As the organic solvent, any solvent may be used without particular limitation as long as it can serve as a medium through which ions involved in the electrochemical reaction of the battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (where R is a straight, branched or cyclic C2-C20 hydrocarbon group, and may include a double-bond aromatic ring or ether bond); amides such as dimethylformamide; dioxolanes such as 1,3-dioxolane; or sulfolane may be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the electrolyte may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAl0_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used as the lithium salt. It is preferable to use the lithium salt in a concentration rage of 0.1 to 2.0 M. If the concentration of the lithium salt is within the above range, since the electrolyte has an appropriate conductivity and viscosity, excellent electrolyte performance can be exhibited, and lithium ions can effectively move.

In order to improve the lifespan characteristics of the battery, suppress a reduction in battery capacity and improve discharge capacity of the battery, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride may be further added to the electrolyte solution in addition to the above electrolyte components. In this case, the additive may be included in an amount of 0.1% to 5% by weight based on the total weight of the electrolyte.

The secondary battery according to the present disclosure as described above may be used as a power source of devices in portable devices such as mobile phones, notebook computers, digital cameras, and electric vehicles such as hybrid electric vehicles (HEVs).

Hereinafter, embodiments of the present disclosure will be described in detail so that those skilled in the art can easily implement them. The present disclosure may be modified in various different ways, and is not limited to the embodiments forth herein.

Preparation Example 1

The hydrate precursors each containing Ni:Co:Mn in a molar ratio of 60:20:20 were mixed at a molar ratio of 1:1.05 with LiOH, and then sintered at 800° C. for 14 hours in a sintering furnace to obtain a positive electrode material of $LiNi_{0.6}Co_{0.2}Mn_{0.2}O_2$.

Preparation Example 2

The hydrate precursors each containing Ni:Co:Mn in a molar ratio of 80:10:10 were mixed at a molar ratio of 1:1.05 with LiOH, and then sintered at 750° C. for 10 hours in a sintering furnace to obtain a positive electrode material of $LiNi_{0.8}Co_{0.1}Mn_{0.1}O_2$.

Example 1

The lithium transition metal oxide prepared in Preparation Example 1 was used as a positive electrode active material, PVdF as a binder, and Super-P as a conductive material. The positive electrode active material:the binder:the conductive material were added in a weight ratio of 96:2:2 to NMP to produce an active material slurry, which was then coated at 250 μm on Al foil, dried in a dryer at 130° C. under an air atmosphere, and then rolled to prepare a spare positive electrode.

The prepared spare positive electrode was exposed under an atmosphere of 25° C. and 35% RH until the lithium by-product content reached 6000 ppm, and then dried again in a dryer at 130° C. to produce a final positive electrode.

To measure the content of the by-product, 10 g of the positive electrode active material was dispersed in 100 mL of water, and then, while titrating with 0.1 M HCl, the change in the pH value was measured to obtain a pH titration curve. Using the pH titration curve, the residual amount of the lithium by-product in each positive electrode active material can be calculated.

Example 2

The spare positive electrode produced in Example 1 was exposed under an atmosphere of 25° C. and 35% RH until the lithium by-product content reached 5000 ppm, and then dried in a dryer at 130° C. to produce a final positive electrode.

Example 3

A final positive electrode was prepared in the same manner as in Example 1, except that the lithium transition metal oxide prepared in Preparation Example 2 was used as a positive electrode active material in Example 1 to produce a spare positive electrode, and the spare positive electrode was made to have a lithium by-product content of 5000 ppm under an atmosphere of 25° C. and 35% RH.

Example 4

The lithium transition metal oxide prepared in Preparation Example 1 was exposed under an atmosphere of 25° C. and 50% RH until the lithium by-product content reached 6000 ppm, and then dried in a dryer at 240° C. to obtain a positive electrode active material powder.

Thereafter, the positive electrode active material powder, PVdF as a binder, and Super-P as a conductive material were used, and the positive electrode active material:the binder:the conductive material was added to NMP in a weight ratio of 96:2:2 to obtain an active material slurry, which was coated at 250 μm on an Al foil, dried in a dryer at 130° C. in an air atmosphere, and then rolled to produce a final positive electrode.

Example 5

The spare positive electrode prepared in Example 1 was exposed under an atmosphere of 25° C. and 50% RH until the lithium byproduct content reached 9000 ppm, and then dried in a dryer at 130° C. to produce a final positive electrode.

Comparative Example 1

The spare positive electrode prepared in Example 1 was exposed under an atmosphere of 25° C. and 35% RH until the lithium by-product content reached 3000 ppm, and then dried again in a dryer at 130° C. to produce a final positive electrode.

Comparative Example 2

A final positive electrode was produced in the same manner as in Example 1, except that the lithium transition metal oxide prepared in Preparation Example 2 was used as the positive electrode active material in Example 1 to prepare a spare positive electrode, and the spare positive electrode was made to have a lithium byproduct content of 2000 ppm under an atmosphere of 25° C. and 35% RH.

Experimental Example 1

The flexibility of the final positive electrodes produced in Examples 1 to 5 and Comparative Examples 1 to 2 was measured, and the results are shown in Table 1 below. As representatives of these, photographs of the results of Example 1 and Comparative Example 1 are shown in FIGS. 1 to 2.

Specifically, for the flexibility test, a 2 pi (Ø) standard measuring rod was prepared, and the final positive electrodes were cut into 5 cm in width and 10 cm in length. The cut electrode was bent as a center to contact the standard measuring rod, and then both ends of the electrode were lifted at a rate of 10 mm per minute. At this time, they were lifted until the force measured by the UTM reached 5N. Thereafter, whether a crack occurred in the electrode was observed through an optical microscope. The experiment was repeated 5 times, and a case where all cracks occurred was indicated by O, a case where no cracks occurred was indicated by X, and a case where only a part occurred was indicated by Δ.

TABLE 1

| | Whether electrode cracks occurred |
|---|---|
| Example 1 | ○ |
| Example 2 | ○ |
| Example 3 | ○ |
| Example 4 | ○ |
| Example 5 | ○ |
| Comparative Example 1 | X |
| Comparative Example 2 | X |

Referring to Table 1 and FIGS. 1 to 2, it can be confirmed that most of the positive electrodes according to the present disclosure are less flexibility and thus cracks occur, which means that the hardness has been increased.

On the other hand, it can be confirmed that Comparative Examples 1 and 2 in which the content of $Li_2CO_3$ is not contained in a specific amount or more have high flexibility.

Experimental Example 2

The final positive electrodes prepared in Examples 1, 3 to 5, and Comparative Examples 1 to 2 were used.

A natural graphite as a negative electrode active material, a carbon black conductive material, an SBR binder, and a CMC thickener were mixed in a weight ratio of 94.5:1.5: 2.5:1.5 in a water solvent to prepare a composition for forming a negative electrode, which was applied to one surface of a copper current collector to produce a negative electrode as a counter electrode.

Using the positive electrode and the negative electrode, 7-stack cell full cells were manufactured, and this was prepared in a state of being fully charged up to 4.2 V. Using a nail penetration tester, a 2.0 mm diameter nail made of SUS303 was penetrated through the center of the cell at the top to measure whether or not ignition occurred, and the results are shown in Table 2 below. As a representative of these, the voltage change and temperature change over time were measured for the cells of Example 1 and Comparative Example 1, and the graphs of the results are shown in FIGS. 3 to 4.

TABLE 2

| | Whether or not ignition occurred | Maximum temperature (° C.) of unignited sample |
|---|---|---|
| Example 1 | X | 60 |
| Example 3 | X | 77 |
| Example 4 | X | 62.5 |
| Example 5 | X | 55 |
| Comparative Example 1 | ○ | |
| Comparative Example 2 | ○ | |

Referring to Table 2 and FIGS. 3 to 4, it can be confirmed that when the positive electrodes according to the present disclosure are used, ignition does not occur, whereas the positive electrodes of Comparative Examples having high flexibility are ignited.

Experimental Example 3

When the final anodes produced in Examples 1 to 5 and Comparative Examples 1 to 2, and coin half cells manufactured using lithium metal as counter electrode were subjected to an initial cycle under a current condition of 0.1 C-rate in a voltage range of 3.0 to 4.3 V, the discharge capacity of the first cycle was compared with the first discharge capacity of the coin half cell produced using the spare positive electrode of Example 1 to measure the capacity reduction rate. The results are shown in Table 3 below.

TABLE 3

| | Reduction in discharge capacity (% vs fresh cell) |
|---|---|
| Example 1 | 1.4% |
| Example 2 | 2.0% |
| Example 3 | 2.5% |
| Example 4 | 1.8% |
| Example 5 | 6% |
| Comparative Example 1 | Less than 1% |
| Comparative Example 2 | Less than 1% |

Referring to Table 3, it can be confirmed that when the positive electrodes of Examples 1 to 4 and Comparative Examples are used, they show similar capacities, whereas in the case of Example 5, the discharge capacity is rapidly decreased.

That is, it can be confirmed that in the case of using the positive electrode of Example 5, the hardness is increased, so that the risk of ignition is reduced, but it is not preferable in terms of capacity.

INDUSTRIAL APPLICABILITY

The positive electrode for a secondary battery according to the present disclosure increases the hardness of the positive electrode by reacting the positive electrode active material with water, thereby hindering the stretching of the current collector during nail penetration and thus improving safety.

In addition, by forming a rock-salt layer on the surface of the positive electrode, it has an effect of increasing the resistance of the active material, thereby suppressing or delaying ignition after nail penetration.

The invention claimed is:

1. A method for producing a positive electrode for a secondary battery, consisting of:

(a) sintering a hydrate precursor to prepare a spare positive electrode active material capable of occluding and releasing lithium;

(b) exposing the spare positive electrode active material to an atmospheric moisture environment to prepare a positive electrode active material containing moisture, wherein the moisture environment is an environment of 30% RH or more at a temperature ranging from 25 to 30° C.;

(c) drying the positive electrode active material containing moisture to prepare a final positive electrode active material;

(d) mixing the final positive electrode active material, a binder, and a conductive material in a solvent to prepare an active material slurry; and (e) applying the active material slurry to at least one surface of a current collector, drying and rolling it to form an electrode.

2. A method for producing a positive electrode for a secondary battery, consisting of:

(a') sintering a hydrate precursor to prepare a positive electrode active material capable of occluding and releasing lithium;

(b') mixing the positive electrode active material, a binder, and a conductive material in a solvent to prepare an active material slurry; and (c') applying the active material slurry to at least one surface of a current collector, drying, and rolling it to form a spare electrode, (d') exposing the spare electrode to an atmospheric moisture environment to prepare a spare electrode containing moisture, wherein the moisture environment is an environment of 30% RH or more at a temperature ranging from 25 to 30° C.; and (e') drying the spare electrode containing moisture to prepare a final electrode.

3. The method for producing the positive electrode according to claim 1, wherein the exposing to the atmospheric moisture environment in the step (b) is the exposing until the content of a lithium by-product in an environment of 35% RH or more satisfies the following Equation 1:

$$\frac{4000}{A} - 2000 \le B(\text{ppm}) \quad \text{[Equation 1]}$$

in the Equation 1,

A is the molar content of Ni when a total mole of transition metal contained in the positive electrode active material is 1, and B is the content of lithium by-product, when A is 0.5 or less, the minimum value of B is 6000 ppm.

4. The method for producing the positive electrode according to claim 2, wherein the exposing to the atmospheric moisture environment in the step (d') is the exposing until the content of a lithium by-product in an environment of 35% RH or more satisfies the following Equation 1:

$$\frac{4000}{A} - 2000 \le B(\text{ppm}) \quad \text{[Equation 1]}$$

in the Equation 1,

A is the molar content of Ni when a total mole of transition metal contained in the positive electrode active material is 1, and B is the content of lithium by-product, when A is 0.5 or less, the minimum value of B is 6000 ppm.

5. The method for producing the positive electrode according to claim 3, wherein the lithium by-product is for promoting an intramolecular and intermolecular crosslinking reaction of the binder for increasing an alpha phase of the binder.

6. The method for producing the positive electrode according to claim 3, wherein the content of the lithium by-product (B) is 8000 ppm or less.

7. The method for producing the positive electrode according to claim 3, wherein the lithium by-product is $Li_2CO_3$.

8. The method for producing the positive electrode according to claim 3, wherein a rock-salt layer is formed on the surface of the positive electrode mixture.

9. The method for producing the positive electrode according to claim 4, wherein the lithium by-product is for promoting an intramolecular and intermolecular crosslinking reaction of the binder for increasing an alpha phase of the binder.

10. The method for producing the positive electrode according to claim 4, wherein the content of the lithium by-product (B) is 8000 ppm or less.

11. The method for producing the positive electrode according to claim 4, wherein the lithium by-product is $Li_2CO_3$.

12. The method for producing the positive electrode according to claim 4, wherein a rock-salt layer is formed on the surface of the positive electrode mixture.

13. The method for producing the positive electrode according to claim 1, wherein the positive electrode has a hardness at which cracks occur in a measuring rod of 2 pi (Ø) or more, during a flexibility test in which when the electrode is bent in half to contact the measuring rod for each pi, and then both ends of the positive electrode are lifted.

14. The method for producing the positive electrode according to claim 2, wherein the positive electrode has a hardness at which cracks occur in a measuring rod of 2 pi (Ø) or more, during a flexibility test in which the electrode is bent in half to contact the measuring rod for each pi, and then both ends of the positive electrode are lifted.

15. The method for producing the positive electrode according to claim 1, wherein the positive electrode active material is a lithium transition metal oxide represented by the following Chemical Formula 1:

$$Li_aNi_xCO_yM_{1-x-y}O_{2-w}A_w \quad \text{[Chemical Formula 1]}$$

wherein M is at least one selected from the group consisting of Ti, Mg, Al, Zr, and Mn, A is an oxygen-substituted halogen, $1.00 \le a \le 1.05$, $0.6 \le x \le 1$, $0 \le y \le 0.4$, $0 \le 1-x-y \le 0.4$, and $0 \le w \le 0.001$.

16. The method for producing the positive electrode according to claim 2, wherein the positive electrode active material is a lithium transition metal oxide represented by the following Chemical Formula 1:

$$Li_aNi_xCo_yM_{1-x-y}O_{2-w}A_w \quad \text{[Chemical Formula 1]}$$

wherein M is at least one selected from the group consisting of Ti, Mg, Al, Zr, and Mn, A is an oxygen-substituted halogen, $1.00 \le a \le 1.05$, $0.6 \le x \le 1$, $0 \le y \le 0.4$, $0 \le 1-x-y \le 0.4$, and $0 \le w \le 0.001$.

17. A method for producing a positive electrode for a secondary battery, consisting of:

(a) preparing a spare positive electrode active material capable of occluding and releasing lithium;

(b) exposing the spare positive electrode active material to an atmospheric moisture environment to prepare a positive electrode active material containing moisture, wherein the moisture environment is an environment of 30% RH or more at a temperature ranging from 25 to 30° C.;

(c) drying the positive electrode active material containing moisture to prepare a final positive electrode active material;

(d) mixing the final positive electrode active material, a binder, and a conductive material in a solvent to prepare an active material slurry; and (e) applying the active material slurry to at least one surface of a current collector, drying and rolling it to form an electrode, wherein the spare positive electrode active material is a lithium transition metal oxide represented by the following Chemical Formula 1:

$$Li_aNi_xCo_yM_{1-x-y}O_{2-w}A_w \quad \text{[Chemical Formula 1]}$$

wherein M is at least one selected from the group consisting of Ti, Mg, Al, Zr, and Mn, A is an oxygen-substituted halogen, $1.00 \leq a \leq 1.05$, $0.6 \leq x \leq 1$, $0 \leq y \leq 0.4$, $0 \leq 1-x-y \leq 0.4$, and $0 \leq w \leq 0.001$.

* * * * *